United States Patent Office 3,315,077
Patented Apr. 18, 1967

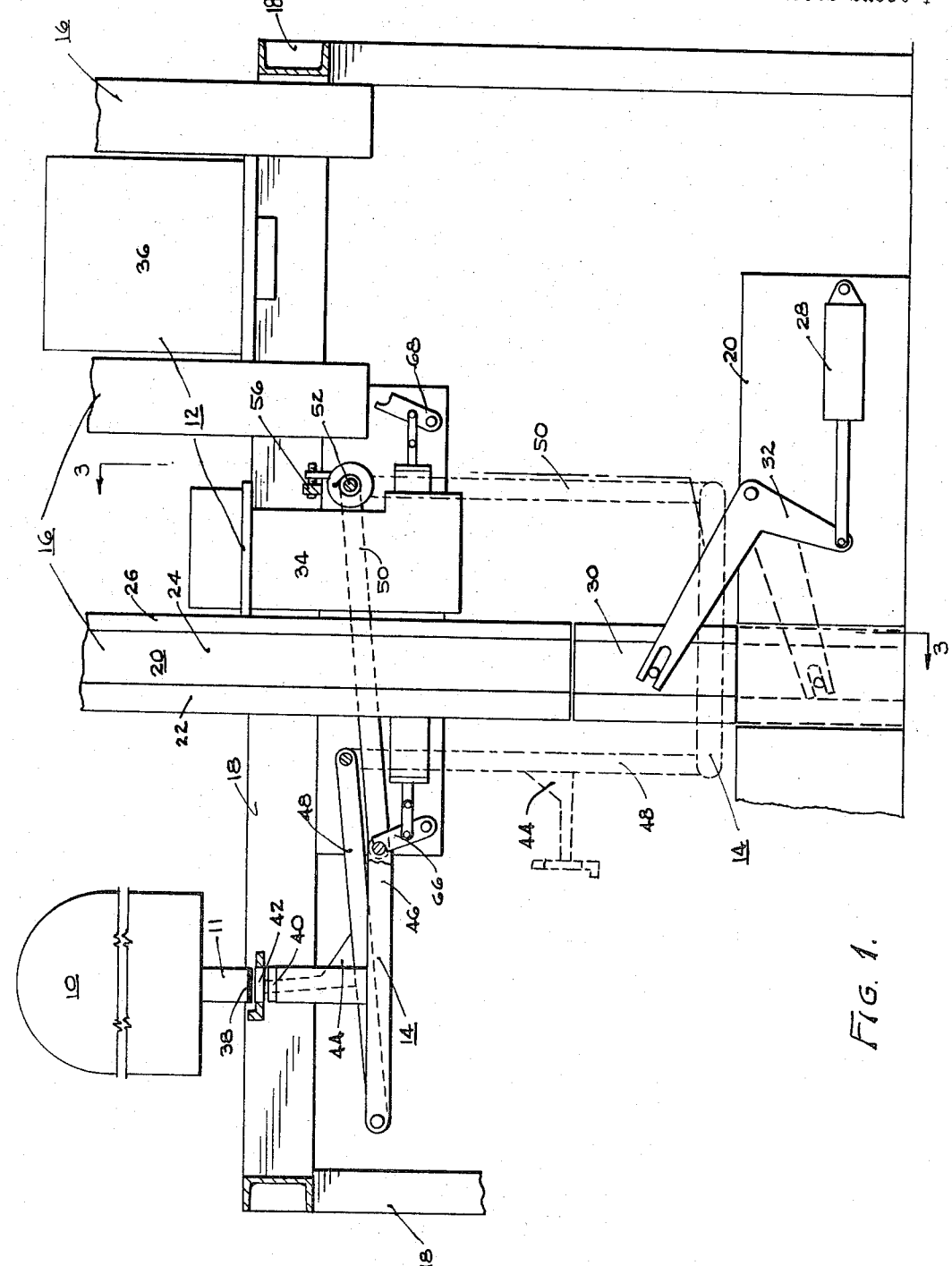

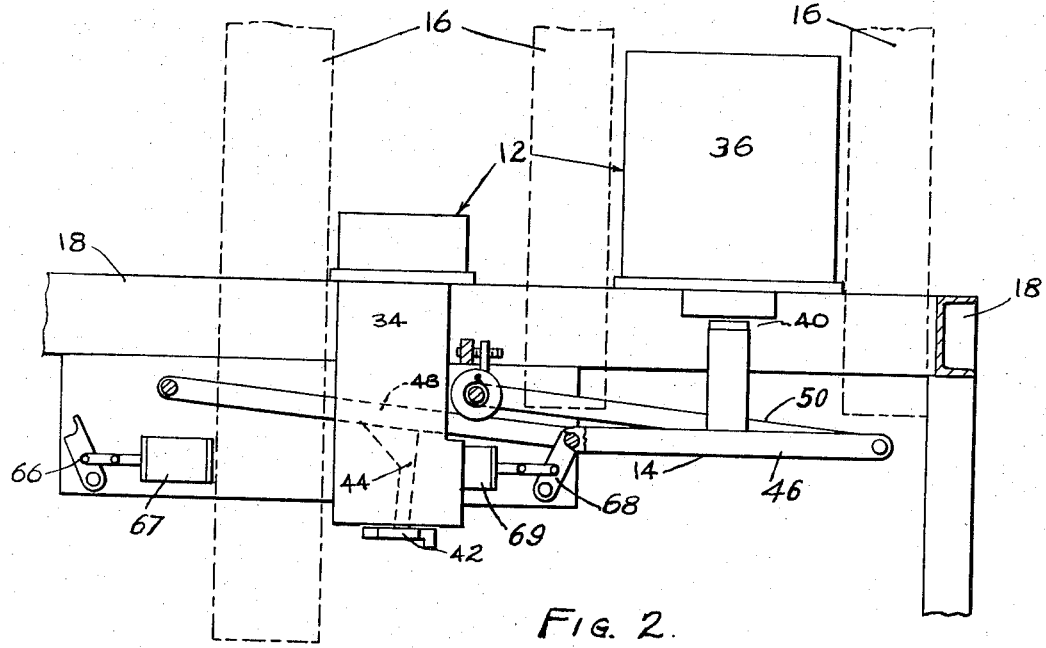
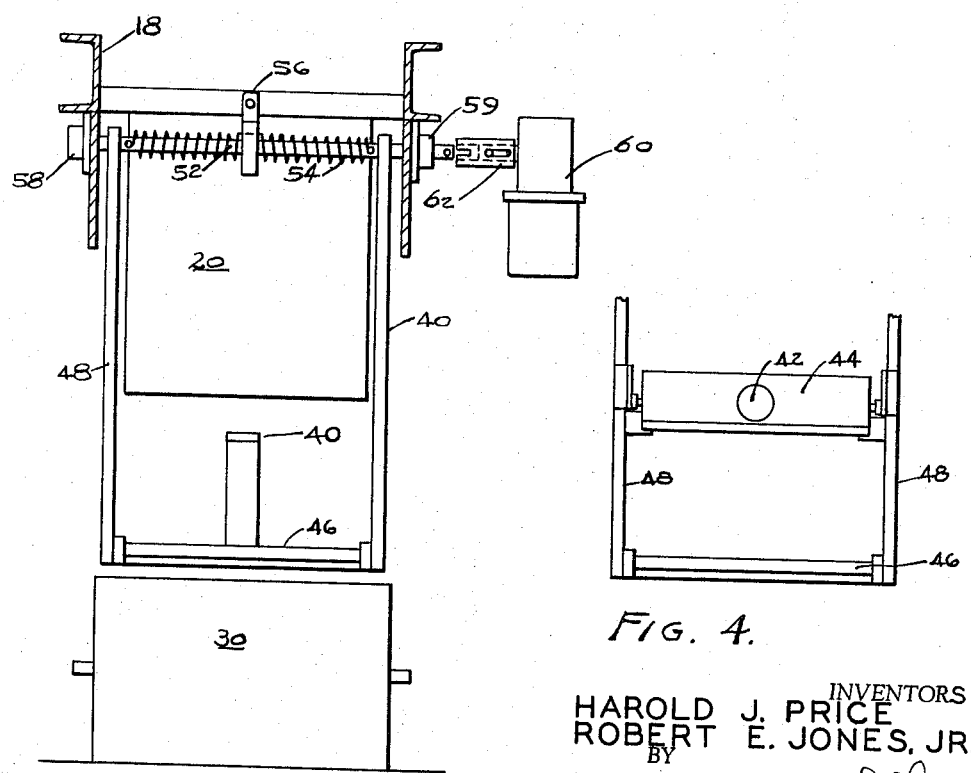

3,315,077
AUTOMATIC NEUTRON ACTIVATOR ANALYZER
Robert E. Jones, Jr., and Harold J. Price, Colorado Springs, Colo., assignors to Kaman Aircraft Corporation, Bloomfield, Conn., a corporation of Connecticut
Filed Aug. 14, 1963, Ser. No. 302,182
13 Claims. (Cl. 250—106)

This invention relates to an activation analyzer and, more specifically, to an automatic neutron activator type analyzer for oxygen. The neutron activation system performs a quantitative analysis of the oxygen content in beryllium samples on a mass production basis. This analysis is achieved by first exposing beryllium samples to a radiation source. The samples are then transferred to a shielded area where the high induced radioactivity in the oxygen is measured by gamma-ray counting equipment. Of the two samples exposed, one is an unknown, the other is a standard sample of known oxygen content. They are both exposed to the radiation source for a set time interval. Upon transferring to the detection or counting position the two samples are separated and their retained irradiation is separately measured by sodium iodide type counters.

In view of the quantitive accuracy required in such a system, there are various factors of critical tolerance which must be met. For example, since the radiation decay rate in such materials is very rapid, the transfer time between exposure and detection is quite critical. Transfer times for some tests are limited to 1 second ±.5. Not only is it necessary to vary the transfer time within said limit but also to maintain a sufficient accuracy of repeatibility once the transfer time is set. As previously mentioned, along with the unknown sample is a known standard sample which is exposed at the same time and is carried by the transfer mechanism to its counting means separate from the counting or detection means of the unknown sample. It is also necessary that the transfer time of the known sample and the transfer time of the unknown be substantially the same. This problem specifically arises wherein the known and unknown samples are separated during the transfer cycle and travel unequal distances between the radiation source and their respective counters. It is also critical that the known and unknown samples are both exposed to the same flux density of radiation for the same period of time. This can be done with two separate radiation sources or a single source.

The transfer mechanism of the present invention fulfills all of the above requirements with a relatively simple and economic structure. The transfer mechanism is basically a collapsible parallelogram structure with a pendulum motion. The amplitude of the swing or the transfer time can be adjusted by a variable torque booster spring with a tolerance of reproducibility greater than 0.1 second. Due to the superimposed positioning of the samples in vertical alignment with a single radiation source, the samples are both exposed to an equal flux density of radiation. As the transfer mechanism begins its swing both samples depart in a vertical direction at the same time and both arrive at their respective counters at exactly the same time after traveling different distances. This equal transfer time is achieved not by any complex structure but by merely mounting the two samples in proper positions on the parallelogram struc-ture. The only moving part in the transfer cycle is the parallelogram structure itself. Although the parallelogram structure is relatively simple the alignment of the samples with respect to the target source or the respective counters is of a high order of tolerance.

It is, therefore, the principal object of the present invention to provide a novel and improved transfer mechanism in an activator analyzer systems.

A second object of the present invention is to provide a transfer mechanism whereby uniform irradiation and transfer time are attained between both known standard and an unknown sample.

Another object is to provide a transfer mechanism with a variable transfer time which can be adjusted to a fine tolerance of reproducibility.

Still another object is to provide an automatic transfer mechanism which operates in combination with a shielding means in an activation analyzer system.

Further objects are to provide a rugged transfer mechanism with a high degree of positioning accuracy and with a minimum of mechanical complexity, moving parts, initial cost and maintenance.

Other objects of the present invention will be in part apparent and in part pointed out specifically hereinafter in connection with the description of the drawings that follows and in which:

FIGURE 1 is a side elevation of the entire activation analyzer system with the transfer mechanism in the exposure position;

FIGURE 2 is a side elevation of a portion of the activation analyzer with the transfer mechanism in the detection position;

FIGURE 3 is an end view of the transfer mechanism taken along line 3—3 of FIGURE 1, as the transfer mechanism is in the cross over position; and, FIGURE 4 is a fragmentary end view taken in portion along line 3—3 of FIGURE 1, showing the relative position of the unknown sample platform and the known standard bracket in the cross over position.

Referring now to the drawings for a detailed description of the present invention and, initially, to FIGURES 1 and 2 for this purpose, it will be seen in general that the oxygen activation analyzer system comprises four general phases: (I) the neutron generator or radiation source 10, (II) gamma-ray counting or detection unit 12, (III) the transfer mechanism 14, and, (IV) the shielding devices 16.

The neutron generator or radiation source 10 is separated from the counting or detection unit 12 by a vertically positioned neutron shield 20. This shield configuration is designed to allow optimum shielding of fast traveling neutrons. The shield 20 comprises three layers. The first layer 22, closest to the neutron generator 10, consists of two inches of steel. This first layer or shadow shield 22 is located on a direct line between the neutron source 10 and the counters 12. The second layer 24 consists of a nine inch layer of polyethylene while the third layer 26 comprises a one inch layer of Boron–10 enriched polyethylene.

The shield 20 at its lower extremities is provided with an aperture shutter 30 located a substantial distance off the direct line between the source 10 and the counters 12. The shutter 30 is operated by an actuator 28 through a bellcrank 32. The actuator 28 functions both as a retaining means for holding the shutter in the closed position and as an air cushion when the shutter drops to the open position, as shown in the dotted line position in FIGURE 1.

The shutter 30 is programmed to operate in sequence with the transfer mechanism 14. As the transfer mechanism is released and approaches the cross-over position, the shutter 30 is fully opened as shown in the dotted line positioning. Shielding around the counting equipment 12 is necessary to reduce natural background irradiation, including cosmic rays, so as not to interfere with the counting procedure. Iron shields of four inch minimum thickness are required around each of the gamma-ray counting devices 34 and 36 depending upon the amount of background irradiation.

The neutron or radiation source is supplied by a neutron generator or accelerator 10 which is positioned upon the base frame 18. The accelerator target 38 is located on the outer extremity of a protrusion 11 from the main body of the generator 10. The interior operations of the generator are fully automatic. The neutron flux density is controlled by means of a small interior $BF_3$ counter. The accelerator target 38 is so positioned that the unknown and standard samples 40 and 42 are placed directly against the target, thus exposing both samples to a uniform neutron flux density. The problem of attaining equal irradiation of both samples 40 and 42 might be attained by various other means such as two separate radiation sources separately exposing the two samples. The present configuration using a single neutron source is preferred for substantial reasons of accuracy, simplicity and cost.

The gamma-ray counting instrumentation 12 of the system comprises two separate and isolated counters 34 and 36. Both of the counters are of the thallium activated sodium iodide type crystal. The counter 34 and 36 are so positioned that as the transfer mechanism 14 reaches the detection positions, as shown in FIGURE 2, the standard sample 42 and unknown 40 lie in a superimposed relation to their respective counters 34 and 36. Both counters are sufficiently isolated from each other by distance and shielding that the radiation of each separate sample does not effect the counter of the other sample.

The transfer mechanism 14 employs a collapsible parallelogram swing linkage which functions as a high amplitude pendulum. The parallelogram 14 swings from the radiation exposure position in FIGURE 1 to the detection or counting position of FIGURE 2 with the assistance of gravity and a booster means, which will be described as the description proceeds. The transfer mechanism or parallelogram structure 14 comprises a sample platform 46 which is pivotally connected at its ends to two pairs of pivoting links 48 and 50. The two pairs of links 48 and 50 are in turn pivotally connected to the base frame 18 of the system to allow the platform 46 to swing back and forth while remaining in the horizontal position. When the samples 40 and 42 are in the exposure position, as illustrated in FIGURE 1, the parallelogram 14 is fully collapsed, both the platform 46 and the pair of trailing links 48 are in substantially parallel relation. This relative positioning of the links and platform permits a near vertical departure from the stationary neutron generator 10. An intermediate dynamic position of the mechanism 14 is shown in the dotted line configuration in FIGURE 1, as it is passing through the aperture 30 in the neutron shield 20. As the transfer mechanism 14 approaches the end of its swing or the detection position as shown in FIGURE 2, the pair of leading links 50 and platform 46 approach a parallel relation and the samples arrive in a near vertical movement at the stationary counters 34 and 36.

The unknown sample 40 is centrally positioned on the sample platform 46, as shown in FIGURES 1, 2, and 3. The known standard sample 42 is held in a bracket assembly 44 as shown in FIGURE 4. The bracket assembly 44 is attached to and located between the pair of trailing links 48. The unknown sample 40 and known standard bracket 44 are so positioned on the transfer mechanism 14 that when the mechanism is in the exposure position both samples lie directly against each other, one on top of the other, in a superimposed relation to the neutron accelerator target 38. As the transfer mechanism 14 starts its cycle or swing to the detection position, the two samples 40 and 42 begin to separate as the parallelogram begins to open. This is best illustrated in the dotted line position of the transfer mechanism shown in FIGURE 1. When the transfer mechanism 14 reaches the detection position the samples 40 and 42 are fully separated and approach their respective isolated counters 34 and 36 in unison. Although the samples travel unequal distances they both depart the neutron source 10 and arrive at their respective counters 34 and 36 at the same time. The transfer mechanism 14, thereby accomplishes equal transfer times for both samples 40 and 42 with a minimum of moving parts and mechanical complexity. Except for the oxygen free stainless antifriction bearings at the link pivots the entire transfer mechanism is constructed of polyethylene.

While in the exposure position the transfer mechanism 14 must be held against gravity by a releasing latch 66 actuated by a solenoid 67. When the transfer mechanism reaches the detection position the sample platform 46 is engaged by a retaining latch 68 which holds the platform 46 in the detection position. The retaining latch 68 may be released by the actuation of solenoid 69.

In order to control and vary the period of transfer time the leading links 50 of the transfer mechanism are power assisted by a booster means which consists of a helically wound torsion spring 54 of very low angular stiffness. The spring 54 is mounted at its extremities on a shaft member 52 which is integral with the pair of leading links 50. The outer ends of the shaft 52 are journalled to the base frame 18 of the system at 58 and 59. The torque of the booster spring 54 is adjustable by means of an anchor member 56 which is held stationary by its attachment to the base frame 18. The anchor 56 adjustably holds the booster spring 54 at its center with a preset torque on both sides of the spring. The usage of a booster means in a pendulum type transfer mechanism facilitates a more uniform transfer time by overcoming friction due to windage, bearings, latches and other unknown factors. The inherent reproducibility of the moment of the pendulum with the preset booster means will allow greater than a 0.1 second reproducibility in transfer time. Furthermore, the movement of the transfer mechanism 14 will allow shock-free sample positioning reproducibility of a very high order.

Also attached to the booster shaft 52 is a compound reduction geared motor 60 which upon activation energizes the booster shaft 52 through a throw-out coupling 62 to return the transfer mechanism 14 back to its initial sample irradiation position. During the normal transfer cycle the motor 60 is completely decoupled from the transfer mechanism to avoid the addition of another factor effecing the transfer time. The prime function of motor 60 is to facilitate a fully automatic cycle so that it is unnecessary for personnel to be behind the shield 20.

Having thus described the several useful and novel features of the present invention, it will be obvious that the many worthwhile objectives for which they were developed have been achieved. Although but the preferred embodiment of this invention has been specifically illustrated and described herein, we realize that certain changes and modifications therein may well occur to those skilled in the art within the broad concepts hereof; hence, it is our intention that the scope of protection afforded hereby shall be limited only insofar as said limitations are expressly set forth in the appended claims.

What is claimed is:

1. In an activation analyzer the combination of a source of radiation, means for detecting radiation induced in a sample by said source of radiation and a transfer means mounted on a supporting means, said transfer means designed to transfer a known and an unknown sample from an exposure position in predetermined proximity to the radiation source to a detection position of predetermined proximity to said detecting means in a manner to permit uniform repeatibility with respect to time and proximity, said transfer means including means for holding a known and an unknown sample to be exposed to said radiation source and to be carried by said transfer means to said detection means.

2. In an activation analyzer the combination as set forth in claim 1 including a shielding means positioned intermediate said radiation source and said detection means designed to restrict the radiation effect of said source on said detection means, said shielding means containing a shutter to momentarily open and allow the passage therethrough of said transfer mechanism.

3. In an activation analyzer the combination as set forth in claim 1 wherein said detection means comprises separate and isolated counting means independently responsive to radiations emanating from said known sample and said unknown sample.

4. In an activation analyzer the combination of a source of radiation, means for detecting radiation induced in a sample by said source of radiation and a transfer means mounted on a supporting means, said transfer means designed to transfer a sample from an exposure position in predetermined proximity to the radiation source to a detection position of predetermined proximity to said detecting means in a manner to permit uniform repeatability with respect to time and proximity, said transfer means includes means for holding a known and an unknown sample to be exposed to said radiation source and to be carried by said transfer means to said detection means, said detection means comprising separate and isolated counting means independently responsive to radiations emanating from said known sample and said unknown sample, said holding means retaining the known and unknown samples in superimposed relationship during radiation exposure and upon transfer to a position adjacent said counting means, the said samples are laterally separated a distance sufficient to essentially avoid the radiation of one sample from acting upon the counter for the other.

5. In an activation analyzer the combination of a source of radiation, means for detecting radiation induced in a sample by said source of radiation and a transfer means mounted on a supporting means, said transfer means designed to swing a sample from an exposure position in predetermined proximity to the radiation source to a detection position of predetermined proximity to said detecting means in a manner to permit uniform repeatability with respect to time and proximity, said detection means comprising separate and isolated counting means independently responsible to radiations emanating from a known sample and an unknown sample, said transfer means comprising a parallelogram structure having one pair of parallel links pivotally mounted on the supporting means of said analyzer and a sample platform pivotally connecting said pivotal links, an unknown sample holding means mounted on said platform, a known sample holding means attached to one of said pivotal links in such a manner that when the transfer means is in the exposure position said sample holding means are aligned in a vertical superimposed relationship for radiation exposure, and when the transfer means swings to the detection position the sample holders are laterally and effectively separated by a distance such that the radiation of one sample will not affect the counting means of the other sample.

6. In an activation analyzer the combination as set forth in claim 1 wherein the transfer means includes an adjustable torque booster means for applying selective torque to said transfer means to provide various uniform transfer times.

7. In an activation analyzer the combination as set forth in claim 1 including releasing and locking means for selectively releasing and locking said transfer means when swung to either the exposure or detection position.

8. In an activation analyzer the combination as set forth in claim 3, wherein said source of radiation comprises a particle accelerator adapted to expose said known and unknown sample to the substantially identical radiation flux, said transfer means designed to transfer each of said samples in equal time intervals from the exposure position wherein said samples are superimposed in substantial alignment with the radiation from said source to a detection position wherein said samples are laterally spaced from each other in close proximity to their respective counters with a substantially identical transfer time.

9. In an activation analyzer, the combination of a frame, a source of radiation supported on said frame, a pair of detection means for detecting the radiation induced in a standard and an unknown sample by said source of radiation, said detection means mounted on said frame remote of said source and of each other and transfer means designed to support a standard and an unknown sample for simultaneous irradiation by said source and to swing said samples to a respective one of said detection means during essentially identical transfer intervals.

10. In an activation analyzer the combination as set forth in claim 9 including a shielding means positioned intermediate said radiation source and said detection means designed to restrict the radiation effect of said source on said detection means, said shielding means containing a shutter designed to momentarily open and allow the passage therethrough of said transfer mechanism.

11. An activation analyzer according to claim 9 wherein said transfer means comprises a sample platform depending and pivotally supported from said frame by parallel links forming a collapsible parallelogram pendulum, said sample platform designed to receive and retain a sample and means mounted on at least one link, intermediate the ends thereof, to support another sample in near vertical alignment with the sample retaining portion of the sample platform when the transfer means is pivoted to one extremity and said samples being laterally separated when the transfer means is pivoted to the other extreme.

12. In an activation analyzer, the combination of a frame, a source of radiation supported on said frame, a pair of detection means for detecting the radiation induced in a standard and an unknown sample by said source of radiation, said detection means mounted on said frame remote of said source and of each other and transfer means designed to support a standard and an unknown sample for simultaneous irradiation by said source and to transport said samples to a respective one of said detection means during essentially identical transfer intervals, said transfer means comprising a sample platform depending and pivotally supported from said frame by parallel links forming a collapsible parallelogram pendulum, said sample platform designed to receive and retain a sample and means mounted on at least one link, intermediate the ends thereof, to support another sample in near vertical alignment with the sample retaining portion of the sample platform when the transfer means is pivoted to one extremity and said samples being laterally separated when the transfer means is pivoted to the other extreme, said transfer means including an adjustable torque booster means interconnecting the frame and said transfer means to apply selected torque loads to said transfer means to provide variable selected transfer times.

13. An activation analyzer according to claim 12 and further including releasing and locking means positioned at each extremity of swing of the transfer means for locking said transfer means in an extreme position and selectively releasing same on command.

References Cited by the Examiner

UNITED STATES PATENTS

| | | | |
|---|---|---|---|
| 2,751,505 | 6/1956 | Anderson | 250—83.1 |
| 2,796,529 | 6/1957 | Morrison | 250—108 X |
| 3,198,948 | 8/1965 | Olson | 250—106 |

OTHER REFERENCES

Theory and Operation of Geiger-Muller Counters—III, by S. C. Brown, from Nucleonics, October 1948, pp. 46–61.

ARCHIE R. BORCHELT, *Primary Examiner.*

RALPH G. NILSON, *Examiner.*